United States Patent [19]
Hernandez-Gil et al.

[11] Patent Number: 4,961,619
[45] Date of Patent: Oct. 9, 1990

[54] LOW LOSS WAVEGUIDE INTERSECTION

[75] Inventors: Jose F. Hernandez-Gil, Matawan; Steven K. Korotky, Toms River; Timothy O. Murphy; John J. Veselka, both of Freehold, all of N.J.

[73] Assignee: AT&T Bell Laboratories, Murray Hill, N.J.

[21] Appl. No.: 318,044

[22] Filed: Mar. 2, 1989

[51] Int. Cl.⁵ .............................................. G02B 6/10
[52] U.S. Cl. .............................. 350/96.12; 350/96.13; 350/96.14
[58] Field of Search ............... 350/96.11, 96.12, 96.13, 350/96.14; 455/610, 612

[56] References Cited

U.S. PATENT DOCUMENTS 4,262,992 4/1981 Berthold, III ..................... 350/96.14
4,730,884 3/1988 Seino et al. ....................... 350/96.14
4,846,540 7/1989 Kapon ............................... 350/96.12
4,850,666 7/1989 Izutsu et al. ...................... 350/96.12

OTHER PUBLICATIONS

"Ti:LiNO₃ Intersecting Waveguides", *Electronics Letters*, vol. 23, No. 2, Jan. 15, 1987, by G. A. Bogert, pp. 72-73.

Primary Examiner—Brian Healy
Attorney, Agent, or Firm—Samuel H. Dworetsky

[57] ABSTRACT

An optical intersection with reduced transmission loss is described. An embodiment of the inventive interconnection comprises two intersecting waveguides. According to the teachings of the invention, deleterious asymmetric field distortions in the waveguides, associated with the presence of the adjacent waveguides, are reduced by, for example, changing the width of the intersection region, and the widths of the waveguides as they approach the intersection region.

10 Claims, 2 Drawing Sheets

LOW LOSS WAVEGUIDE INTERSECTION

FIELD OF THE INVENTION

This invention involves intersecting optical waveguides with reduced transmission loss, and optical communications systems involving such waveguide intersections.

BACKGROUND OF THE INVENTION

As the field of optical communications has grown, new applications have pushed the limits of associated technologies beyond the capabilities that were available just a few short years ago. One of these new applications is the use of optical switches to interconnect numerous subscribers without transforming the optical signal into an electrical signal. Suggested optical switch architectures include the relatively elementary crossbar architecture and more sophisticated architectures such as the banyon, Benes, Clos and shuffle architectures. Two significant limitations which must be considered in evaluating these various architectures are crosstalk and loss. The crosstalk limitation may be alleviated by implementing various "dilated" versions of the above architectures, all of which are well known in the art. However, the problem of loss still looms large. Deleterious loss may be associated with any one of a number of different phenomena. However, the losses associated with intersecting optical waveguides, which may be used in the aforementioned switch architectures, is of special concern because that loss will be a function of the number of intersections encountered in a particularly selected path, and therefore will vary with path. To this extent, the losses associated with optical intersections are currently the most troublesome in the effort to develop and commercialize large optical switch designs.

SUMMARY OF THE INVENTION

This invention is an "optical waveguide intersection" with reduced loss. In an exemplary embodiment, the inventive intersection comprises at least two intersecting waveguides whose dimensions, transverse to the direction of propagation but in the plane of the intersecting waveguides, decreases as the waveguides approach the region of intersection. Additionally, the minimum width of the combined waveguides in the region of intersection but in the plane of the intersecting waveguides may be reduced below the value which is obtained when the waveguides are "unmodified", i.e., when the dimension of each of the waveguides transverse to the direction of propagation but in the plane of the intersecting waveguides remains unchanged as the waveguides approach, and traverse, the region of intersection. In an embodiment of the invention the at least two waveguides intersect at an angle which is selected to reduce the well-known crosstalk phenomenon.

The specific embodiment of the invention described above is found to result in effective reduction, in a given transmitting waveguide as it approaches the intersection, of the electro-magnetic field distortion associated with the presence of adjacent waveguides. Accordingly, the invention in its most generic form involves any means for so reducing, in a given transmitting waveguide as it approaches an intersection, the electromagnetic field distortion associated with the presence of adjacent waveguides.

The inventive intersection can be used advantageously in optical switch architectures, or in other applications in optical communications systems, including, for example, optical computing and optical sensing.

DETAILED DESCRIPTION

Figure 1:
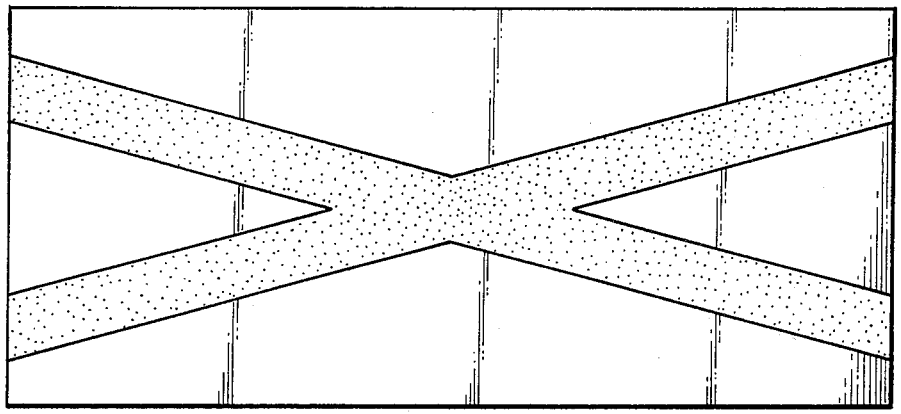
FIG. 1 is an embodiment of the invention.

The invention is an optical intersection with lowered loss characteristics. The invention arises from applicants realization that the loss associated with such intersections may be attributed, at least in part, to optical field distortions within the transmitting waveguides as they approach the intersection. Such distortion results from the influence of adjacent waveguides on the mode configuration of a given waveguide near the optical intersection. Applicants find that even when the angle of intersection is sufficiently large so that little, if any, power is transferred from one waveguide to another, the optical field distribution associated with a particular mode in a given transmitting waveguide is still distorted by the presence of adjoining waveguides. This distortion in a given waveguide as it approaches the intersection is asymmetric to the distortion experienced in the very same waveguide as it leaves the intersection. Accordingly, the field configurations in the incoming and outgoing portions of the waveguide do not match at the point of intersection and radiative losses occur at that point.

(It should be noted that the term "optical" as used here is meant to be broader than merely the visible region of the electro-magnetic spectrum. Rather, the term as used here, is meant to include all regions of the optical spectrum which can be transmitted in dielectric media with losses less than 10, 5, or 2 dB per km. It should be noted that for the devices described here the transmission losses may be as great as 10 dB per cm or even greater. Such losses can be tolerated in these devices because of the very small physical dimensions of the devices, which therefore contribute only minimally to the overall absolute transmission loss of the signal. However, for long distance transmission, for example, over optical fibers, the lower loss characteristics previously mentioned are required, and therefore, such loss characteristics are used here as a benchmark in the definition of the term "optical". Accordingly, the term "optical" is defined with reference to those regions of the electro-magnetic spectrum which are used in optical communications systems. More specifically, this region of the spectrum will generally range from 0.2 to 20 or even 50 microns. Currently, the regions of the spectrum which are most often used in optical communications range from 0.6 to 2 microns. The term "waveguide" as used here is meant to include exemplary dielectric structures which, in accordance with solutions of Maxwell's equations, will transmit electro-magnetic energy in at least one direction without diffractive losses.)

It will now be clear to those of skill in the art that the transmission losses which are reduced by the practice of this invention arise from the interaction between the field associated with the light propagating in one waveguide, and the optical characteristics of the second waveguide. In some sense, the light propagating in one waveguide "feels" or is "scattered" by the optical characteristics associated with the second waveguide, and the transmission characteristics of this first waveguide are accordingly distorted with concomitant increase in the loss at the point of intersection. Clearly, this deleterious effect increases as the angle of intersection decreases, because under such circumstance the distance over which the intersecting waveguides are in proximity increases. In fact, as the angle of intersection becomes smaller than approximately 5 degrees, for waveguides of approximately 8 microns in width and $\Delta n = 0.01$ (where $\Delta n$ is the difference between the average index of refraction of a waveguide and the average index of refraction of the adjacent substrate material), the amount of interaction becomes so great that the resultant "crosstalk" becomes prohibitive. Accordingly, for waveguides of the above-described physical characteristics, intersection angles of less than 5 degrees are usually not practical. An embodiment which will be described here involved an angle of intersection of 10 degrees.

FIG. 1 is an embodiment of a prior art optical intersection. This prior art embodiment may be viewed as two waveguides which are placed over each other at some intersecting angle. In the intersection shown in FIG. 1, the dimensions of each of the waveguides remains unchanged, resulting in an intersection region which has a dimension greater than the transverse dimension, or "width", of either of the optical waveguides.

The waveguides shown in FIG. 1, as well as embodiments of the invention, may be fabricated using techniques well known to practitioners in the field. Such techniques include the fabrication of channel waveguides using Ti-doped LiNbO$_3$ as disclosed by G. A. Bogert in *Electronics Letters*, Vol. 23, No. 2, Jan. 15, 1987, pgs 72–73, in an article entitled "Ti:LiNO$_3$ Intersecting Waveguides".

Figure 2:
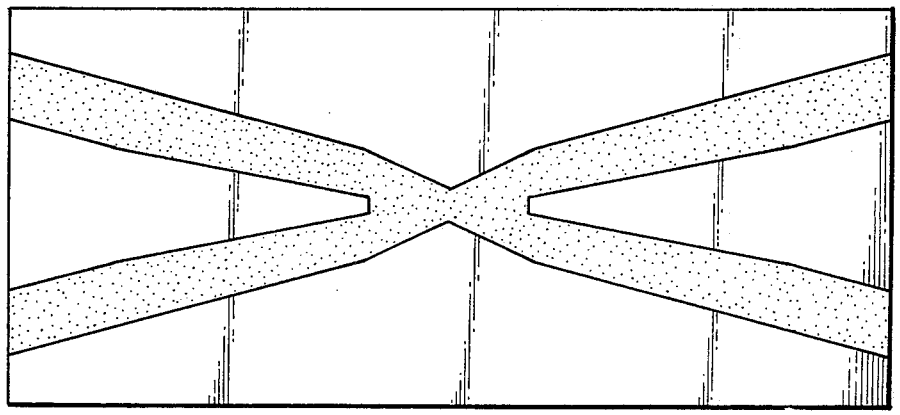
FIG. 2 is a schematic representation of an embodiment of the inventive optical intersection.

FIG. 2 is an embodiment of the inventive optical intersection. Aspects of the invention shown in FIG. 2, become readily apparent when compared with FIG. 1. Such inventive aspects include the "down-tapering" of the waveguides as they approach the intersection region, and the reduction in dimensions of the intersection region itself. Applicants have found that such modification of the optical waveguides as they approach the optical intersection, and of the intersecting region itself, results in reduction in transmission losses arising from optical field distortions experienced in prior art optical intersections.

Figure 3:
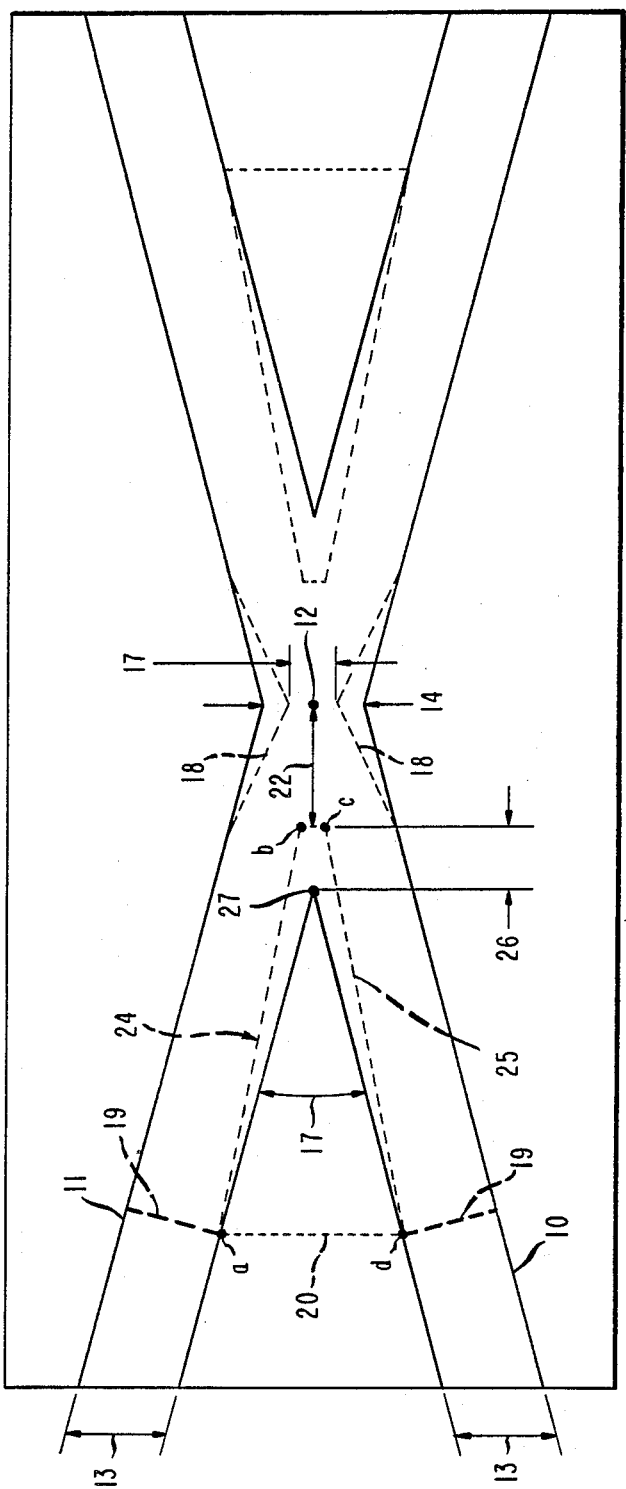
FIG. 3 is a schematic representation showing dimensional differences between the prior art optical intersection and an embodiment of the inventive optical intersection.

FIG. 3 is a schematic representation which highlights some of the exemplary dimensional difference between a prior art optical intersection and an embodiment of the inventive optical intersection. In this FIG., 10 and 11 are buried channel waveguides which intersect at 12. In an embodiment of the invention, the waveguides are single mode waveguides. The angle of intersection $\phi$, given by 17 in the FIG., may be selected so as to reduce crosstalk, in accordance with teaching of the prior art. Although in many embodiments the waveguides will have different widths, in the embodiment shown in FIG. 1, the waveguides widths, identified as 13, are the same for the two waveguides.

In FIG. 3, the prior art optical intersection is shown by solid lines. In accordance with such prior art embodiment, the width of the waveguides remain constant through the intersection. The width of the optical intersection at the point of intersection, shown in FIG. 3 as 14, and sometimes referred to as the "waist" of the intersection, is the minimum width of the combined waveguides in the region of intersection and in the plane of the intersecting waveguides.

The inventive optical interconnection is distinguished from the prior art interconnection as shown by the dotted lines in FIG. 3, and comprises two intersecting waveguides whose dimensions, transverse to the direction of propagation, but in the plane of the intersecting waveguides, changes, usually decreasing, as the waveguides approach the region of intersection. This is shown in FIG. 3 by dotted lines 24 and 25. Furthermore, in an alternative embodiment of the invention, the waist of the intersection may also be reduced. Accordingly, in such an embodiment, the waist of the intersection may be shown by dotted line 18 in FIG. 3.

According to one embodiment of the invention, the waveguides may be channel waveguides of the buried or ridge form. The structure for such waveguides and their fabrication techniques are well known to practitioners in the art. Such structures may comprise, for example, titanium diffused lithium niobate or epitaxially grown semiconductor homostructures or heterostructures. Additionally, embodiments of the invention may comprise well known optical fiber structures, as well as other planar and channel, glass or crystalline structures.

Although the discussion of this invention has been in terms of modifying the physical dimensions of optical waveguides in order to improve the loss characteristics at the intersection of such waveguides, it will now be clear to those of average skill in the art that such modification may be effected by appropriate index variations, rather than by decreasing a dimension of the optical waveguide as it approaches the intersection. In fact, as those skilled in the art will appreciate, the term "decrease" when applied to a dimension of the waveguide refers most generically to such appropriate variations in the index of refraction which effectively "decrease" the waveguide region. Such variations will usually comprise reductions in the index of refraction in the boundary regions of the waveguide relative to the index of refraction in the more central regions of the waveguide.

Accordingly, the invention may be described in terms of the index of refraction distribution of the waveguide, for example, transverse to the direction of propagation. In most optical waveguides such transverse distribution will be independent of the direction of propagation. In accordance with an aspect of this invention, however, the transverse index of refraction is varied axially, or in other words, along the direction of propagation, as the intersection is reach. Such a variation may result in an effective "narrowing" of the guiding region. Prior art optical waveguides including, for example, optical fibers, may have involved such axial variations in the distribution of the index of refraction along the transverse direction. An example of such axial variations in the transverse index distribution of a waveguide is the well-known "up-tapers" which are used to vary the size of the beam so as to obtain better alignment characteristics. However, such possible prior practice is distinguished from the present invention in at least one of two ways. Firstly, such axial variations in the transverse index distribution have not been used in optical waveguides in regions adjacent to an intersection. Secondly, such axial variations are symmetric in the transverse direction about the axis of symmetry of the waveguide along the direction of propagation. In this invention, however, the inventive axial variation in the distribution of the index of refraction along the transverse direction is asymmetric about an axis of symmetry of the optical waveguide along the direction of propagation. An alternative way of expressing this characteristic of the invention is that the "modified" intersecting waveguides of this invention have a transverse distribution in index of refraction which is asymmetric relative to the axis of symmetry of the unmodified waveguide along the direction of propagation.

Although an embodiment of the invention may be described, as above, in terms of asymmetric modifications of the intersecting waveguides, geometries may be constructed in which the invention can be practiced with symmetric modification of the waveguides as they approach the point of intersection. Exemplary of such symmetric embodiments of the invention is an embodiment involving the intersection of, for example, four optical waveguides at a single point of intersection. In such an exemplary embodiment only the two central waveguides may realize the improved loss associated with practice of the invention. However, these two central waveguides, which may be the only ones used for transmission, may be *symmetrically* tapered, with the requisite field distortion being effected by the presence of the two external waveguides. In an embodiment where these two external waveguides are not used for transmission, they may also be symmetrically tapered. (In this embodiment, tapering may still be necessary at the waist of the intersection.) However, if the external waveguides are also to be low loss, those external waveguides will likely be asymmetrically tapered, while the central waveguides may remain substantially symmetrically tapered. This asymmetry of the external waveguides is necessary under such circumstances because they, in turn, do not have adjacent waveguides to produce the necessary salutary influence on the transmission characteristics of the optical waveguide previously described.

The preceding discussion of the invention has been in terms of various specific embodiments. However, in its most generic form the invention involves the use of any means which effectively counter-balances or removes, in a given waveguide, the asymmetric field distortion associated with the presence of adjacent waveguides. In the discussion of specific embodiments, one disclosed technique for reducing the said distortion comprised a reduction in the transverse dimension of the waveguides as they approached the region of intersection. Other techniques may involve any axial variation in the transverse index of refraction distribution of the waveguides as they approach the intersection. Accordingly, electro-optical means, rather than physical changes in the material of the waveguide, may be used to impress an axial variation upon the transverse index of refraction of the waveguides, or a more general variation in the index of refraction of the intersection region.

The representation of the waveguides in the FIGS. may give the impression that the boundaries of the waveguides are accurately defined. However, in fact, embodiments of the invention involving diffused waveguides, and most other embodiments of the invention, will involve waveguides which in some sense have no exact boundary, since the transverse index of refraction distribution often decays in some continuous fashion. Nevertheless, for purposes of description, the waveguides of the FIGS. are shown with distinct boundaries.

Dimensions of a specific embodiment of the invention, involving single mode waveguides operating at 1.3 microns may be described with reference to what we describe in FIG. 3 as the point of intersection 12. Modification of the waveguides is initiated at a point along each waveguide, "a" and "b", whose axial distance is 140 microns from this point of intersection. For further clarification, at points "a" and "b", line 19 is shown as intersecting the waveguide along a direction perpendicular to the direction of propagation. The center of line 19 is 140 microns from point 12. Line 20 connects points "a" and "b". Modification of the waveguide begins at these points "a" and "b" defined by line 19, and continues until line b-c is intersected. Line b-c is distanced from the point of intersection 12 by an amount given by 22. Distance 22 is 45 microns in this embodiment. Line b-c is drawn parallel to line 20, and the trapezoid defined by these two lines, and lines 24 and 25, define the region of modification. This region has an identical region symmetrically located at the output side of the intersection, as shown in the FIG. In this embodiment of the invention, line b-c is 2 microns long. The distance 26 from line b-c to point 27 in the unmodified waveguide is 2.75 microns. All of these numbers are given for identically intersecting waveguides of width, 13, equal to 8 microns. The waist 17 of the modified intersection is given in accordance with elementary principles of trigonometry by 8 microns/(cosine $\phi/2$) where $\phi$ is the angle of intersection of the waveguides. In this particular embodiment of the invention computer simulations and laboratory demonstrations have shown that losses associated with traversal of optical radiation through the intersection are reduced by a factor of approximately 50 percent.

The inventive embodiment of FIGS. 2 and 3 may be fabricated according to principles well known in the art and described in G. A. Bogert op cit, which is hereby incorporated by reference into this application. According to these well-known techniques, the inventive intersection described above in quantitative detail was formed in a lithium niobate substrate using titanium diffusion.

The behavior of the intersection and its effect on loss characteristics were analyzed using iterative computer techniques which describe the transmission characteristics of the device according to the well-known beam propagation method which was described, for example, by Thylen at the Meeting on Numerical Simulation and Analysis in Guided Wave Optics, Houston, Texas, Feb., 1989.

We claim:
1. An optical intersection comprising
   at least two waveguides which intersect to form a region of intersection
   each of the at least two waveguides, as it approaches the region of intersection, being in sufficiently close proximity to the other of the at least two waveguides, so as to distort asymmetrically the electro-magnetic field configuration associated with light transmitted in the said other of the at least two waveguides
   the invention characterized in that
   the optical intersection further comprises
   means for reducing the said distortion comprising an axial variation in the transverse index of refraction distribution of the said waveguides as the said waveguides approach the intersection region.

2. The device of claim 1 wherein the means for reducing the distortion further comprises an axial variation in the transverse index of refraction distribution in the said region of intersection.

3. The device of claim 1 wherein the said means comprises a reduction in the transverse dimension of the waveguide as it approaches the region of intersection.

4. The device of claim 3 wherein the said means further comprises a reduction in the dimension of the intersection region when compared with the intersection region associated with intersecting waveguides of constant transverse width.

5. An optical intersection comprising at least two waveguides which intersect to form a region of intersection each of the at least two waveguides, as it approaches the region of intersection, being in sufficiently close proximity to the other of the at least two waveguides, so as to distort asymmetrically the electro-magnetic field configuration associated with light transmitted in the said other of the at least two waveguides the invention characterized in that the optical intersection further comprises means for reducing the said distortion comprising electro-optical means for impressing an axial variation in the transverse index of refraction distribution of the said waveguides as the said waveguides approach the intersection region.

6. The device of claims 1 or 5 wherein the angle at which the at least two waveguides intersect is sufficiently large so that substantially no power is transferred between the at least two waveguides.

7. The device of claim 6 wherein the said angle is greater than 5 degrees.

8. The device of claim 7 wherein the said angle is less than 10 degrees.

9. The device of claims 1 or 5 wherein the said waveguides are channel planar waveguides.

10. The device of claim 9 wherein the said waveguides are part of a heterostructure device.

* * * * *